United States Patent
Cook et al.

(10) Patent No.: US 10,356,732 B2
(45) Date of Patent: Jul. 16, 2019

(54) NARROWBAND SIGNAL DETECTION FOR NETWORK PROTECTION

(71) Applicant: WILSON ELECTRONICS, LLC, St. George, UT (US)

(72) Inventors: Patrick Lee Cook, Cedar City, UT (US); Christopher Ken Ashworth, St. George, UT (US); Vernon Alan VanBuren, Las Vegas, NV (US)

(73) Assignee: WILSON ELECTRONICS, LLC, St. George, UT (US)

( * ) Notice: Subject to any disclaimer, the term of this patent is extended or adjusted under 35 U.S.C. 154(b) by 138 days.

(21) Appl. No.: 15/479,557

(22) Filed: Apr. 5, 2017

(65) Prior Publication Data
US 2017/0288766 A1    Oct. 5, 2017

Related U.S. Application Data
(60) Provisional application No. 62/318,562, filed on Apr. 5, 2016.

(51) Int. Cl.
*H04B 7/155* (2006.01)
*H04W 52/52* (2009.01)

(52) U.S. Cl.
CPC ........ *H04W 52/52* (2013.01); *H04B 7/15535* (2013.01)

(58) Field of Classification Search
CPC ............................ H04B 7/15507; H04W 52/52
See application file for complete search history.

(56) References Cited

U.S. PATENT DOCUMENTS

| | | | |
|---|---|---|---|
| 4,247,939 A | 1/1981 | Stromswold et al. |
| 4,776,032 A | 10/1988 | Odate et al. |
| 5,303,395 A | 4/1994 | Dayani |
| 5,737,687 A | 4/1998 | Martin et al. |
| 5,777,530 A | 7/1998 | Nakatuka |
| 5,835,848 A | 11/1998 | Bi et al. |
| 5,864,550 A | 1/1999 | Posti |
| 6,005,884 A | 12/1999 | Cook et al. |
| 6,711,388 B1 | 3/2004 | Neitiniemi |

(Continued)

FOREIGN PATENT DOCUMENTS

| | | |
|---|---|---|
| EP | 1525678 B1 | 7/2008 |
| JP | 3877256 B2 | 2/2000 |

(Continued)

OTHER PUBLICATIONS

Global Patent Solutions; Search Report; dated May 1, 2015; 9 Pages.

(Continued)

*Primary Examiner* — Kashif Siddiqui
(74) *Attorney, Agent, or Firm* — Thorpe North & Western (57) ABSTRACT

Technology for a repeater is disclosed. The repeater can include a narrowband detector configured to detect one or more power levels that correspond to one or more signals communicated in one or more sub-bands of a selected band. The repeater can include a controller. The controller can select a signal from the one or more signals based on a power level of the selected signal. The controller can adjust a gain or output power of the repeater based on the power level of the selected signal communicated in the one or more sub-bands of the selected band.

27 Claims, 5 Drawing Sheets

(56) References Cited

U.S. PATENT DOCUMENTS

| | | |
|---|---|---|
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren et al. |
| 7,522,556 B2 | 4/2009 | Hanna et al. |
| 7,974,573 B2 | 7/2011 | Dean |
| 8,419,627 B2 | 4/2013 | Koide et al. |
| 2002/0044594 A1 | 4/2002 | Bongfeldt |
| 2002/0045461 A1 | 4/2002 | Bongfeldt |
| 2003/0123401 A1 | 7/2003 | Dean |
| 2004/0137854 A1 | 7/2004 | Ge |
| 2004/0146013 A1 | 7/2004 | Song et al. |
| 2004/0156097 A1* | 8/2004 | Roper .............. H04B 7/15535 359/341.41 |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 | 6/2005 | Allen et al. |
| 2006/0084379 A1 | 4/2006 | O'Neill |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0278237 A1 | 11/2008 | Blin |
| 2009/0290526 A1* | 11/2009 | Gainey ................ H04B 7/155 370/315 |
| 2010/0075704 A1 | 3/2010 | Mchenry et al. |
| 2011/0151775 A1 | 6/2011 | Kang et al. |
| 2011/0317647 A1* | 12/2011 | Cho .................. H04L 5/0007 370/329 |
| 2013/0203403 A1* | 8/2013 | Cook .................. H04W 24/02 455/423 |
| 2015/0011157 A1* | 1/2015 | Terry ................ H04B 7/15535 455/10 |
| 2018/0034533 A1* | 2/2018 | Lee .................... H04B 7/155 |

FOREIGN PATENT DOCUMENTS

| | | |
|---|---|---|
| JP | 2006/115149 | 4/2006 |
| KR | 100825659 B1 | 4/2008 |
| WO | WO 03/013028 A1 | 2/2003 |

OTHER PUBLICATIONS

Mill et al.; "Auditory-Inspired Interval Statistic Receivers for Passive Sonar Signal Detection." OCEANS 2007—Europe; IEEE; Jun. 18-21, 2007; 6 Pages.

PCT Application No. PCT/ US2017/026069, Filing Date Apr. 5, 2017, Patrick Lee Cook; International Search Report; dated Jul. 11, 2017; 13 Pages.

Polacek et al.; "The Use of Digital Modulation Signals in Radar System for Detection of Nonlinear Scatterers." Radar Symposium (IRS) 2011 Proceedings International; IEEE; Sep. 7-9, 2011; 5 Pages.

Shellhammer et al.; "Performance of Power Detector Sensors of DTV Signals in IEEE 802.22 WRANs." TAPAS '06 Proceedings of the First International Workshop on Technology and Policy for Accessing Spectrum; Aug. 5, 2006; Article No. 4; 9 Pages.

"IEEE/ANSI Standard for Compliance Testing of Transmitters Used in Licensed Radio Services." Accredited Standards Committee C63—Electromagnetic Compatibility; IEEE: 181 Pages.

3GPP2 C.S0011-B; "Recommended Minimum Performance Standards for cdma2000® Spread Spectrum Mobile Stations"; TIA-98-E; (Dec. 13, 2002); 448 pages; Release B, Version1, Revision E.

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50-8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

* cited by examiner

FIG. 6 and a wireless communication access point, such as a cell tower. Signal boosters can improve the quality of the wireless communication by amplifying, filtering, and/or applying other processing techniques to uplink and downlink signals communicated between the wireless device and the wireless communication access point.

NARROWBAND SIGNAL DETECTION FOR NETWORK PROTECTION

RELATED APPLICATIONS

The present application claims priority to U.S. Provisional Patent Application No. 62/318,562, filed Apr. 5, 2016, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
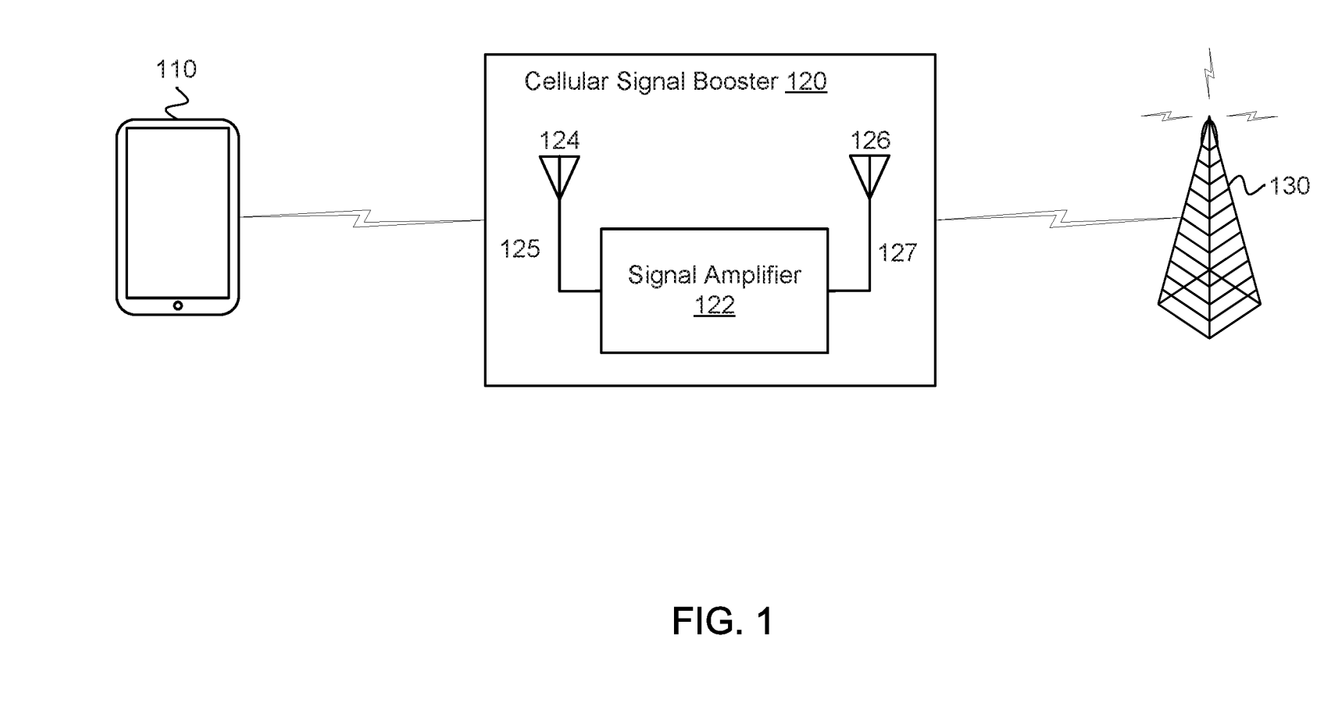
FIG. 1 illustrates a signal booster in communication with a wireless device and a base station in accordance with an example.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering.

The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-October).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In one configuration, a cellular signal booster or repeater can include a controller operable to perform network protection in order to protect a cellular network from overload and/or noise floor increase. The controller can perform network protection by adjusting a gain and/or noise power for each band in uplink transmission paths based on data from each band in downlink transmission paths. The data from each band in the downlink transmission paths can include a booster station coupling loss (BSCL) or a received signal strength indication (RSSI). The controller can perform network protection in accordance with the Federal Communications Commission (FCC) Consumer Booster Rules, which necessitate that uplink signal paths and downlink signal paths are to operate jointly to achieve network protection. Therefore, if the cellular signal booster includes multiple downlink signal chains and a single uplink signal chain, then each downlink signal chain can relate to or communicate with the single uplink signal chain for network protection purposes.

In one example, in order to perform network protection, the controller can identify a received signal strength indication (RSSI) for each band in the selected number of downlink transmission paths. The controller can identify one or more downlink transmission paths that correspond to a maximum RSSI as compared to other downlink transmission paths in the cellular signal booster. The controller can adjust (e.g., increase or decrease) an uplink gain or noise power for each band in the selected number of uplink transmission paths based on the maximum RSSI for each band. As a result, the cellular signal booster can protect a base station in the cellular network from becoming overloaded with uplink signals from the cellular signal booster that exceed a defined power threshold.

In another example, in order to perform network protection, the controller can identify a booster station coupling loss (BSCL) for each band in a selected number of downlink transmission paths. The controller can identify one or more downlink transmission paths that correspond to a minimum BSCL for each band as compared to other downlink transmission paths in the cellular signal booster. The controller can adjust (e.g., increase or decrease) an uplink gain or noise power for each band in the selected number of uplink transmission paths based on the minimum BSCL for each band. When noise protection is performed at the cellular signal booster, each band in the cellular signal booster can be adjusted separately. As a result, the cellular signal booster can protect a base station in the cellular network from becoming overloaded with uplink signals from the cellular signal booster that exceed a defined power threshold. As a non-limiting example, the controller can reduce the uplink gain for each band on the uplink transmission path when the BSCL is relatively low.

In one example, a first DL path at a first band can be associated with a first RSSI, and a second DL path at a second band can be associated with a second RSSI. A maximum RSSI value can be identified between the first RSSI and the second RSSI. The uplink gain or noise power on the UL signal path at a selected band can be adjusted (e.g., increased or decreased) based on the maximum RSSI value in order to protect the base station in the cellular network. The RSSI for each DL path can effectively estimate a distance between the cellular signal booster and the base station. If the cellular signal booster is located relatively close to the base station, then the RSSI can be relatively high, and therefore, the uplink gain or noise power on the UL signal path can be reduced for each band in order to protect the base station. If the uplink gain is not reduced, then the base station's noise floor can be raised and/or the base station can be overloaded with strong uplink signals from the cellular signal booster (i.e., uplink signals that exceed a defined power threshold). In addition, reducing the uplink gain can protect the base station's uplink receive sensitivity. In another example, if the cellular signal booster is located relatively far from the base station, then the RSSI can be relatively low, and therefore, the uplink gain or noise power on the UL signal path can be increased for each band.

Figure 2:
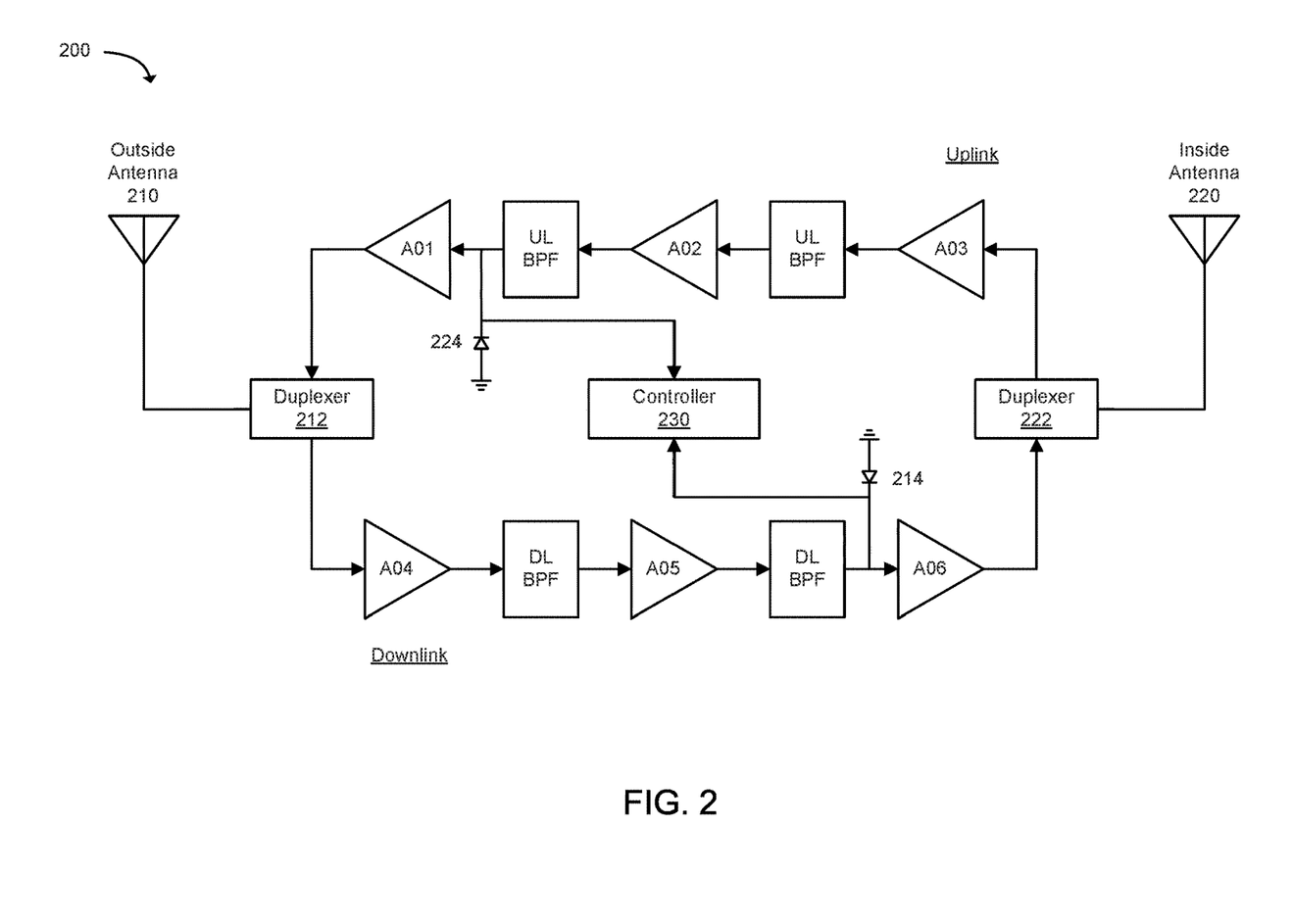
FIG. 2 illustrates a signal booster that includes a broadband signal detector in accordance with an example.

FIG. 2 illustrates an example of a bi-directional broadband cellular signal booster 200 (or repeater). The cellular signal booster 200 can include an outside antenna 210, an inside antenna 220 and a controller 230. The outside antenna 210 can send/receive signals to a base station (not shown). The inside antenna 220 can send/receive signals to a mobile device (not shown). The controller 230 can perform various functions for the cellular signal booster 200, such as automatic gain control, oscillation detection, and other network protection standards.

In one example, the cellular signal booster 200 can include a first duplexer 212 and a second duplexer 222. A downlink signal path can be communicatively coupled between the first duplexer 212 and the second duplexer 222. The downlink signal path can include one or more amplifiers (e.g., A04, A05 and A06) and one or more DL bandpass filters (BPF) for amplification and filtering of downlink signals, respectively. Similarly, an uplink signal path can be communicatively coupled between the first duplexer 212 and the second duplexer 222. The uplink signal path can include one or more amplifiers (e.g., A01, A02 and A03) and one or more UL bandpass filters (BPF) for amplification and filtering of uplink signals, respectively.

In one example, the outside antenna 210 can receive a downlink signal from the base station. The downlink signal can be provided to the first duplexer 212, and then to the downlink signal path for amplification and filtering. The downlink signal (which has now been amplified and filtered) can be provided to the second duplexer 212, and then to the inside antenna 220 for transmission to the mobile device. In another example, the inside antenna 220 can receive an uplink signal from the mobile device. The uplink signal can be provided to the second duplexer 222, and then to the uplink signal path for amplification and filtering. The uplink signal (which has now been amplified and filtered) can be provided to the first duplexer 212, and then to the outside antenna 210 for transmission to the base station.

In one example, the cellular signal booster 200 can include UL and DL BPFs in the uplink and downlink signal paths, respectively. Each UL and DL BPF can have a defined passband, which is measured in megahertz (MHz). All signals on frequencies within a certain passband can pass through the corresponding UL or DL BPF, while signals on frequencies that are outside that certain passband are attenuated.

In one configuration, when the cellular signal booster 200 is a multiple-band signal booster, the cellular signal booster 200 can include a radio frequency (RF) detector on each uplink and downlink band, as the cellular signal booster 200 can always be operating on all bands. For example, as shown, the downlink signal path can include a DL RF detector 214 and the uplink signal path can include an UL RF detector 224. The DL and UL RF detectors 214, 224 can enable the controller 230 to perform various functions for the cellular signal booster 200, such as automatic gain control, oscillation detection, and other network protection standards. The DL and UL RF detectors 214, 224 can be diodes, or alternatively, the DL and UL RF detectors 214, 224 can be log-detector integrated circuits (ICs), which can achieve an increased detection range. The DL and UL RF detectors 214, 224 can be positioned after the DL and UL BPFs, respectively, in the cellular signal booster 200. The DL and UL RF detectors 214, 224 can convert a composite signal power in the respective BPF's entire passband to a proportional direct current (DC) voltage.

In one configuration, some network protection standards, such as the FCC Consumer Booster Standard, require determining a distance between the cellular signal booster 300 and a base station. This determination of the distance can allow the cellular signal booster 300 to adjust its gain and/or noise power output to protect the base station (and the cellular network as a whole). The cellular signal booster 300 can detect a composite downlink power in an entire passband associated with the DL BPF (via the DL RF detector 214) in order to determine the distance between the cellular signal booster and the base station. The composite downlink power can be expressed as a received signal strength indication (RSSI).

In one example, a wideband consumer signal booster can satisfy a consumer signal booster network protection standard when a transmitted noise power in dBm/MHz of the consumer signal booster at their uplink and downlink ports does not exceed [−103 dBm/MHz—RSSI]. Here, the RSSI is the downlink composite received signal power in dBm at a booster donor port for all base stations in the band of operation. RSSI is expressed in negative dB units relative to 1 mW. However, certain underlying assumptions were made when determining a minimum power that is transmitted from the base station, and the above equation is derived for a worst-case by assuming this minimum transmitted power. In practice, the base station transmitted power can usually be significantly higher than the underlying assumptions made when determining the minimum power that is transmitted from the base station.

In previous solutions, the composite downlink power that is detected by the DL RF detector 214 in an entire passband can include a downlink power associated with multiple base stations that are in the same area as the cellular signal booster 200. In other words, the composite downlink power can be increased due to the multiple base stations in the area. Since the cellular signal booster 200 can detect the composite downlink power associated with the multiple base stations in the area (as opposed to detection of downlink power associated with individual base stations), in previous solutions, the cellular signal booster 200 would detect a stronger downlink signal (i.e., with a stronger power level), and thus the controller 230 in the cellular signal booster 200 would start reducing its gain and/or noise power in a reduced amount of time (e.g., sooner than necessary).

Figure 3:
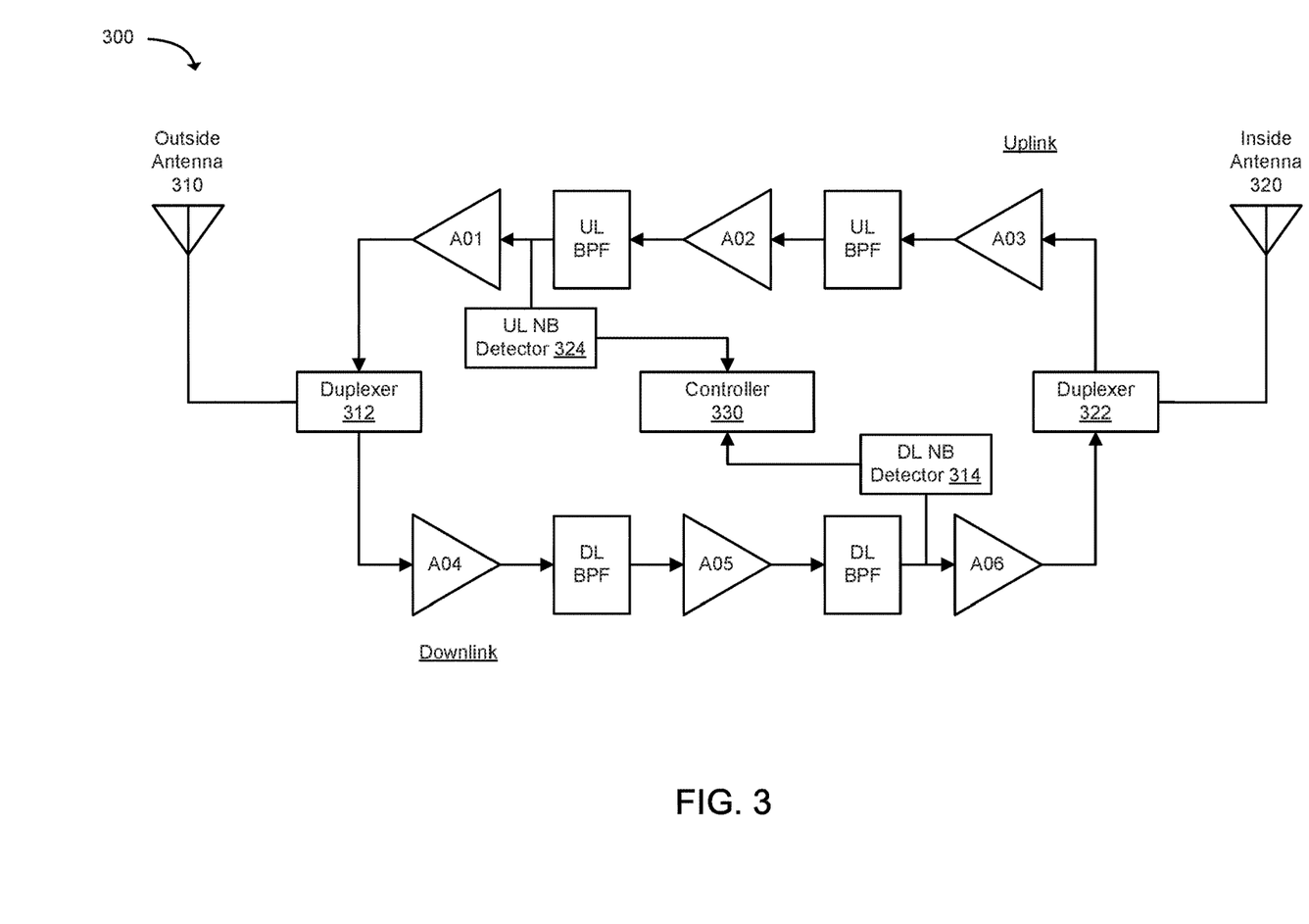
FIG. 3 illustrates a signal booster that includes a narrowband signal detector in accordance with an example.

FIG. 3 illustrates an example of a bi-directional broadband cellular signal booster 300 (or repeater). The cellular signal booster 300 can include an outside antenna 310, an inside antenna 320 and a controller 330. The outside antenna 310 can send/receive signals to a base station (not shown). The inside antenna 320 can send/receive signals to a mobile device (not shown). The controller 330 can perform various functions for the cellular signal booster 300, such as automatic gain control, oscillation detection, and other network protection standards.

In one example, the cellular signal booster 300 can include a first duplexer 312 and a second duplexer 322. A downlink signal path can be communicatively coupled between the first duplexer 312 and the second duplexer 322. The downlink signal path can include one or more amplifiers (e.g., A04, A05 and A06) and one or more DL bandpass filters (BPF) for amplification and filtering of downlink signals, respectively. Similarly, an uplink signal path can be communicatively coupled between the first duplexer 312 and the second duplexer 322. The uplink signal path can include one or more amplifiers (e.g., A01, A02 and A03) and one or more UL bandpass filters (BPF) for amplification and filtering of uplink signals, respectively.

In one configuration, the cellular signal booster 300 can be a broadband or wideband detector that is operable to perform narrowband detection. For example, the cellular signal booster 300 cab include a downlink narrowband (NB) detector 314 in the downlink signal path and an uplink narrowband detector 324 in the uplink signal path. The downlink narrowband detector 314 can detect downlink power levels associated with signals communicated from base station(s) to the cellular signal booster 300 in sub-blocks or channels or sub-bands in a defined passband. In one example, the downlink power levels can be RSSI values. Higher RSSI values can correspond to signals that are transmitted from base stations that are a relatively close distance from the cellular signal booster 300, while lower RSSI values can correspond to signals that are transmitted from base stations that are a relatively far distance from the cellular signal booster 300.

In one example, the detected downlink power levels can be provided from the downlink narrowband detector 314 to the controller 330. The controller 330 can identify the downlink power levels and select one of the downlink power levels. For example, the controller 330 can select a maximum power level, which can correspond to a signal transmitted from a base station that is a shortest distance from the cellular signal booster 300 among a group of base stations. Alternatively, the controller 300 can select one of the downlink power levels using a different criterion (e.g., a minimum power level, etc.) Then, the controller 330 can adjust (e.g., increase or decrease) its gain and/or noise power in accordance with the selected downlink power level. For example, when the controller 330 selects the maximum power level, the controller 330 can adjust its gain and/or noise power only for the nearest base station among the group of base stations, as the nearest base station can be most impacted by the cellular signal booster 300 as compared to the other base stations in the group.

In one example, the downlink narrowband detector 314 can be in contrast to a broadband detector, which would detect a composite downlink power for signals communicated in an entire passband). Similarly, since the downlink power levels are each associated with signals transmitted in sub-blocks or channels or sub-bands in the defined passband (as opposed to the entire passband), the downlink power levels may be smaller than a composite downlink power that would be detected by a broadband detector. Therefore, this reduced detection bandwidth can potentially reduce the signal power presented to the downlink narrowband detector 314, which can allow the cellular signal booster 300 to maintain a maximum gain and noise power. In contrast, competitor signal boosters that only detect the composite downlink power may be forced to reduce their gain and/or noise power. By utilizing the downlink narrowband detector 314 to detect power levels for each sub-block or channel or sub-band, the cellular signal booster 300 can achieve increased signal coverage and customer satisfaction based on the maximum gain and noise power.

As an example, a selected passband can be a B25 downlink passband, which can correspond to 1930-1995 megahertz (MHz). While a broadband detector would detect a composite power level for the entire 65 MHz band, a narrowband detector can detect power levels for selected sub-blocks or channels or sub-bands in the B25 downlink passband. These selected sub-blocks or channels or sub-bands can range from 100 kilohertz (kHz) or less up to 20 MHz or more depending on network constraints.

In one configuration, the downlink narrowband detector 314 in the cellular signal booster 300 (or repeater) can detect one or more power levels that correspond to one or more signals communicated in one or more sub-bands of a selected band. For example, the downlink narrowband detector 314 can detect the one or more power levels by sweeping the selected band. The power levels can include RSSI levels. The controller 330 can select a signal from the one or more signals based on a power level of the selected signal. The power level of the selected signal can correspond to a maximum power level of the one or more signals communicated in the selected band. The controller 330 can adjust a gain or output power of the cellular signal booster 300 based on the power level of the selected signal communicated in the one or more sub-bands of the selected band. In one example, the controller 330 can adjust the gain or output power of the cellular signal booster 300 to meet a network protection or government standard.

In an alternative configuration, the downlink narrowband detector 314 in the cellular signal booster 300 (or repeater) can detect one or more power levels that correspond to one or more signals communicated in one or more sub-bands of a selected band. The controller 330 can select a power level from the one or more power levels, and the selected power level can correspond to one of the signals communicated in the one or more sub-bands of the selected band. The controller 330 can adjust a gain or output power of the repeater based on the selected power level.

In one configuration, the controller 330 can determine a distance between the cellular signal booster 300 and each base station that transmits the one or more signals in the selected band based on the one or more power levels that correspond to the one or more signals. In another configuration, the controller 330 can adjust one or more of: the gain, a transmitted noise power or the output power of the cellular signal booster 300 to protect a base station that is a shortest distance from the cellular signal booster 300 among a plurality of base stations. The base station that is the shortest distance from the cellular signal booster 300 among the plurality of base stations can communicate a signal with a maximum power level as compared to the one or more signals communicated from the plurality of base stations.

In yet another configuration, the controller 330 can adjust the gain of the cellular signal booster 300 to protect a base station among a plurality of base stations, and the protected base station is not a shortest distance from the cellular signal booster 300 among the plurality of base stations. In other words, the controller 330 can adjust the gain (and not noise power) to protect a base station that is further way than a nearest base station. The gain (and not noise power) can be adjusted in this manner when there are no users on the nearest base station.

In one configuration, the downlink narrowband detector 314 can have a variable narrowband detection bandwidth depending on network conditions. For example, each of the one or more sub-bands included in the selected band can range from 100 kilohertz (KHz) to 20 megahertz (MHz) depending on network conditions. The frequency of the sub-bands can be less than the frequency of the selected bands.

In one example, the one or more sub-bands can be associated with known cellular carriers. For example, a particular cellular carrier can own and/or operate a specific sub-band in a selected band (e.g., a particular cellular carrier can own/operate 5-10 MHz in B25, which has a frequency range of 65 MHz).

In one example, the controller 330 can perform network protection to protect individual cellular carriers that operate in predefine sub-bands of a selected band. As a non-limiting example, a particular cellular carrier can operate 10 MHz in B25, which has a frequency range of 65 MHz. In this example, the controller 330 can use the downlink narrowband detector 314 to detect power levels corresponding to only the 10 MHz in B25 which is operated by the particular cellular carrier, as opposed to determining a composite power level that corresponds to the entire B25 (i.e., all 65 MHz of B25), which can be operated by multiple cellular carriers. The power levels corresponding to the 10 MHz in B25 which is operated by the particular cellular carrier can be smaller than the composite power level corresponding to the entire B25, which can result in a more accurate reduction of a gain and/or noise power when performing network protection.

In one example, the downlink narrowband detector 314 can scan a selected band and identify a plurality of power levels for sub-bands in the selected band. The frequency range of each of the sub-bands (e.g., 1 MHz) can be determined by the controller 330 and indicated to the downlink narrowband detector 314. The controller 330 can receive the plurality of power levels from the downlink narrowband detector 314. The controller 330 can select one of the power levels (which corresponds to a signal that is transmitted with a highest channel power), and then perform network protection for the cellular signal booster 300 based on the selected power level.

In one configuration, the cellular signal booster 300 can include a broadband detector configured to measure a composite power level of the selected band. In addition, the cellular signal booster 300 can include a single pole double throw (SPDT) switch or a single pole single throw (SPST) switch operable to switch between the broadband detector and the downlink narrowband detector 314. In an alternative configuration, the cellular signal booster 300 can include diode or log-detector that can be used for both narrowband and broadband detection. For example, the diode or log-detector can switch between a narrowband detection mode and a broadband detection mode.

In one configuration, the downlink and uplink narrowband detectors 314, 324 can be implemented in a variety of manners. For example, the downlink and uplink narrowband detectors 314, 324 can be spectrum analyzers. Alternatively, the downlink and uplink narrowband detectors 314, 324 can be variable bandwidth narrowband detectors that utilize mixers, synthesizers and intermediate frequency (IF) filters. Alternatively, the downlink and uplink narrowband detectors 314, 324 can be digital narrowband detectors, in which IF filters can be replaced with analog-to-digital (ADC) converters and processors. The usage of digital narrowband detectors can eliminate sweeping the selected band, which can achieve faster performance. In another alternative, the downlink and uplink narrowband detectors 314, 324 can include internal band pass filter (BPF) functions.

In one configuration, the downlink narrowband detector 314 can be utilized only for the downlink signal path, whereas the uplink narrowband detector 324 can be utilized only for the uplink signal path, which can overcome isolation concerns. The usage of the uplink narrowband detector 324 can enable an enhanced base station overload protection. Alternatively, the same narrowband detector can be utilized for both the downlink and uplink signal paths.

In one configuration, the cellular signal booster 300 can include single pole single throw (SPST) and/or single pole double throw (SPDT) switch to each of the uplink and/or downlink signal paths in order to increase isolation.

Figure 4:
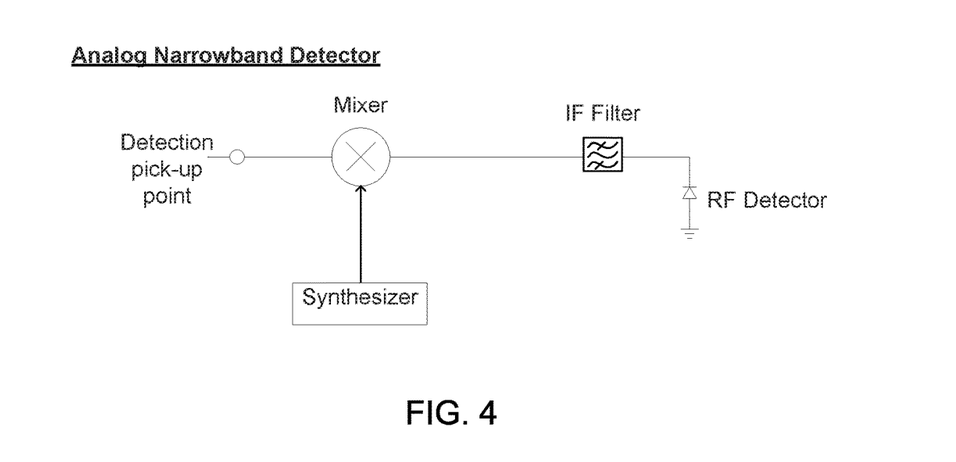
FIG. 4 illustrates an analog narrowband detector in accordance with an example.

FIG. 4 illustrates an exemplary analog narrowband detector. For example, from a detection pick-up point, a signal can be provided to a mixer. The mixer can be communicatively coupled to a synthesizer. The signal can be provided from the mixer to an intermediate frequency (IF) filter. Then, the signal from the IF filter can be detected using a radio frequency (RF) detector. The analog narrowband detector can be utilized in a cellular signal booster or repeater.

Figure 5:
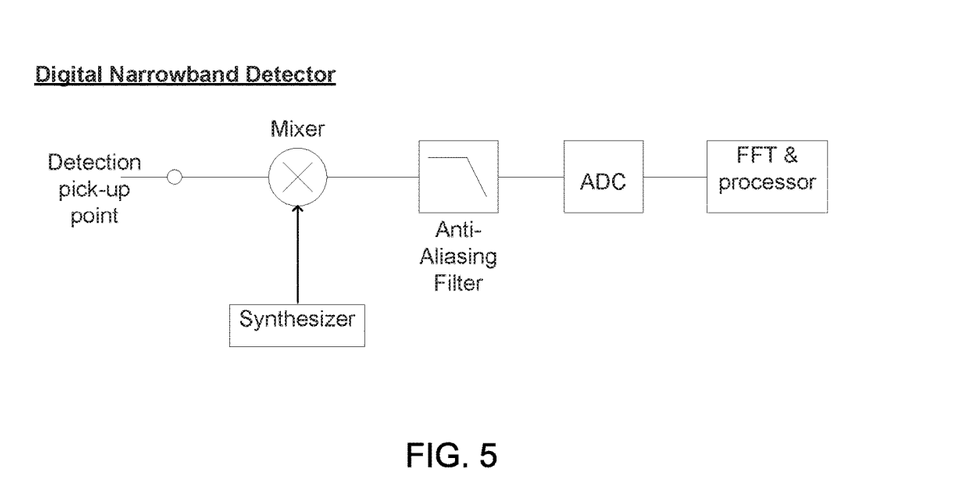
FIG. 5 illustrates a digital narrowband detector in accordance with an example.

FIG. 5 illustrates an exemplary digital narrowband detector. For example, from a detection pick-up point, a signal can be provided to a mixer. The mixer can be communicatively coupled to a synthesizer. The signal can be provided from the mixer to an anti-aliasing filter and then to an analog-to-digital (ADC) converter and then to a fast Fourier transform (FFT) and processor. The digital narrowband detector can be utilized in a cellular signal booster or repeater.

Figure 6:
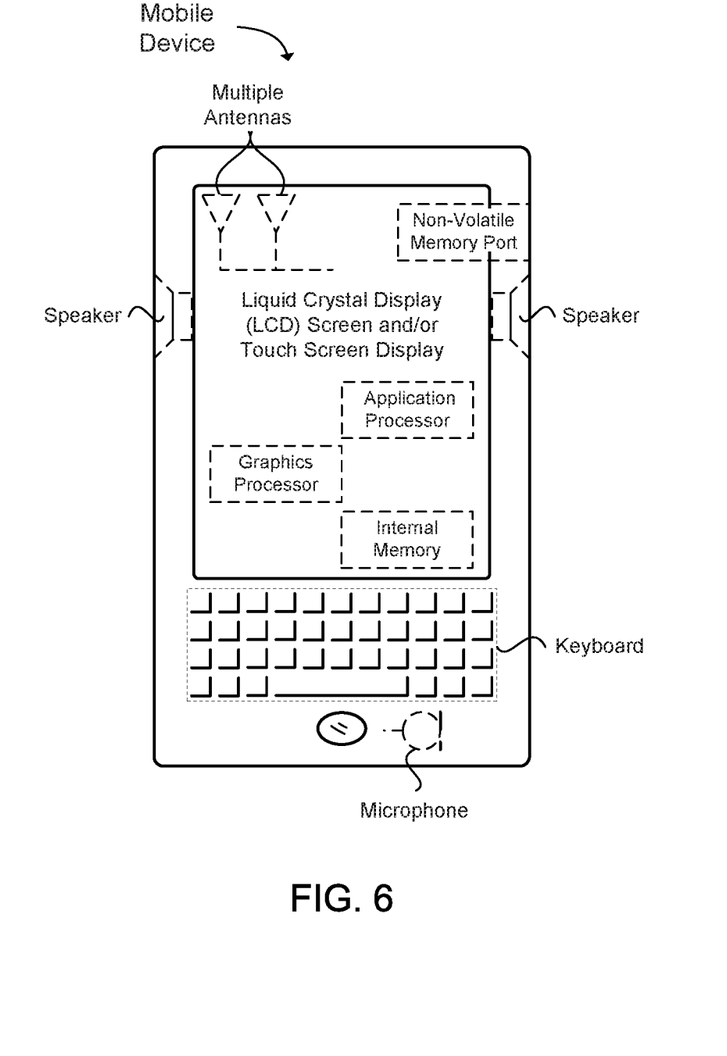
FIG. 6 illustrates a wireless device in accordance with an example.

FIG. 6 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising: a narrowband detector configured to detect one or more power levels that correspond to one or more signals communicated in one or more sub-bands of a selected band; and a controller configured to: select a signal from the one or more signals based on a power level of the selected signal; and adjust a gain or output power of the repeater based on the power level of the selected signal communicated in the one or more sub-bands of the selected band.

Example 2 includes the repeater of Example 1, wherein the power level of the selected signal corresponds to a maximum power level of the one or more signals communicated in the selected band.

Example 3 includes the repeater of any of Examples 1 to 2, wherein the controller is configured to determine a distance between the repeater and each base station that transmits the one or more signals in the selected band based on the one or more power levels that correspond to the one or more signals.

Example 4 includes the repeater of any of Examples 1 to 3, wherein the controller is configured to adjust one or more of: the gain, a transmitted noise power or the output power of the repeater to protect a base station that is a shortest distance from the repeater among a plurality of base stations.

Example 5 includes the repeater of any of Examples 1 to 4, wherein the base station that is the shortest distance from the repeater among the plurality of base stations communicates a signal with a maximum power level as compared to the one or more signals communicated from the plurality of base stations.

Example 6 includes the repeater of any of Examples 1 to 5, wherein the controller is configured to adjust the gain of the repeater to protect a base station among a plurality of base stations, wherein the protected base station is not a shortest distance from the repeater among the plurality of base stations.

Example 7 includes the repeater of any of Examples 1 to 6, further comprising a second narrowband detector, wherein the narrowband detector is utilized for a selected downlink band and the second narrowband detector is used for a selected uplink band.

Example 8 includes the repeater of any of Examples 1 to 7, wherein the narrowband detector is configured to detect the one or more power levels by sweeping the selected band.

Example 9 includes the repeater of any of Examples 1 to 8, wherein each of the one or more sub-bands included in the selected band can range from 100 kilohertz (KHz) to 20 megahertz (MHz) depending on network conditions.

Example 10 includes the repeater of any of Examples 1 to 9, wherein the one or more sub-bands are associated with known cellular carriers.

Example 11 includes the repeater of any of Examples 1 to 10, wherein the controller is configured to perform one or more of: automatic gain control, oscillation detection or network protection for the repeater.

Example 12 includes the repeater of any of Examples 1 to 11, further comprising a broadband detector configured to measure a composite power level of the selected band.

Example 13 includes the repeater of any of Examples 1 to 12, further comprising a single pole double throw (SPDT) switch or a single pole single throw (SPST) switch operable to switch between the broadband detector and the narrowband detector.

Example 14 includes the repeater of any of Examples 1 to 13, further comprising one or more signal paths to amplify and filter signals, wherein the signals include one or more of uplink signals or downlink signals.

Example 15 includes the repeater of any of Examples 1 to 14, wherein the one or more power levels include received signal strength indicator (RSSI) levels.

Example 16 includes the repeater of any of Examples 1 to 15, wherein a narrowband detection bandwidth of the narrowband detector is variable depending on network conditions.

Example 17 includes the repeater of any of Examples 1 to 16, wherein the controller is configured to adjust the gain or output power of the repeater to meet a network protection or government standard.

Example 18 includes the repeater of any of Examples 1 to 17, wherein the narrowband detector is one or more of: a spectrum analyzer; a variable bandwidth narrowband detector; a digital narrowband detector; or a narrowband detector that includes a bandpass filter.

Example 19 includes a signal booster, comprising: memory; and one or more processors configured to: identify one or more power levels that correspond to one or more signals communicated in one or more sub-bands of a selected band; select a signal from the one or more signals based on a power level of the selected signal; and perform a network protection by adjusting a gain or output power of the repeater based on the power level of the selected signal communicated in the one or more sub-bands of the selected band.

Example 20 includes the signal booster of Example 19, wherein the power level of the selected signal corresponds to a maximum power level of the one or more signals communicated in the selected band.

Example 21 includes the signal booster of any of Examples 19 to 20, wherein the one or more processors are configured to determine a distance between the repeater and each base station that transmits the one or more signals in the selected band based on the one or more power levels that correspond to the one or more signals.

Example 22 includes the signal booster of any of Examples 19 to 21, wherein the one or more processors are configured to perform the network protection by adjusting the gain or output power of the repeater to protect a base station that is a shortest distance from the repeater among a plurality of base stations.

Example 23 includes the signal booster of any of Examples 19 to 22, wherein the one or more sub-bands are associated with known cellular carriers.

Example 24 includes the signal booster of any of Examples 19 to 23, wherein each of the one or more sub-bands included in the selected band can range from 100 kilohertz (KHz) or less to 20 megahertz (MHz) or more depending on network conditions.

Example 25 includes a repeater, comprising: at least one narrowband detector configured to detect one or more power levels that correspond to one or more signals communicated in one or more sub-bands of a selected band; and a controller configured to: select a power level from the one or more power levels, wherein the selected power level corresponds to one of the signals communicated in the one or more sub-bands of the selected band; and adjust a gain or output power of the repeater based on the selected power level.

Example 26 includes the repeater of Example 25, wherein the selected power level corresponds to a maximum power level among the one or more power levels.

Example 27 includes the repeater of any of Examples 25 to 26, wherein the at least one narrowband detector includes a narrowband detector for each selected uplink band and selected downlink band.

Example 28 includes the repeater of any of Examples 25 to 27, wherein the controller is configured to adjust the gain or output power of the repeater to meet a network protection or government standard.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
a narrowband detector configured to detect one or more power levels that correspond to one or more signals communicated in one or more sub-bands of a selected band; and
a controller configured to:
select a signal from the one or more signals based on a power level of the selected signal; and
perform a network protection by adjusting a gain or output power of the repeater based on the power level of the selected signal communicated in the one or more sub-bands of the selected band, wherein the gain or output power is adjusted to protect a base station among a plurality of base stations, and the protected base station is not a shortest distance from the repeater among the plurality of base stations.

2. The repeater of claim 1, wherein the power level of the selected signal corresponds to a maximum power level of the one or more signals communicated in the selected band.

3. The repeater of claim 1, wherein the controller is configured to determine a distance between the repeater and each base station that transmits the one or more signals in the selected band based on the one or more power levels that correspond to the one or more signals.

4. The repeater of claim 1, wherein the controller is configured to adjust one or more of: the gain, a transmitted noise power or the output power of the repeater to protect a base station that is a shortest distance from the repeater among a plurality of base stations.

5. The repeater of claim 4, wherein the base station that is the shortest distance from the repeater among the plurality of base stations communicates a signal with a maximum power level as compared to the one or more signals communicated from the plurality of base stations.

6. The repeater of claim 1, further comprising a second narrowband detector, wherein the narrowband detector is utilized for a selected downlink band and the second narrowband detector is used for a selected uplink band.

7. The repeater of claim 1, wherein the narrowband detector is configured to detect the one or more power levels by sweeping the selected band.

8. The repeater of claim 1, wherein each of the one or more sub-bands included in the selected band can range from 100 kilohertz (KHz) to 20 megahertz (MHz) depending on network conditions.

9. The repeater of claim 1, wherein the one or more sub-bands are associated with known cellular carriers.

10. The repeater of claim 1, wherein the controller is configured to perform one or more of: automatic gain control or oscillation detection for the repeater.

11. The repeater of claim 1, further comprising a broadband detector configured to measure a composite power level of the selected band.

12. The repeater of claim 11, further comprising a single pole double throw (SPDT) switch or a single pole single throw (SPST) switch operable to switch between the broadband detector and the narrowband detector.

13. The repeater of claim 1, further comprising one or more signal paths to amplify and filter signals, wherein the signals include one or more of uplink signals or downlink signals.

14. The repeater of claim 1, wherein the one or more power levels include received signal strength indicator (RSSI) levels.

15. The repeater of claim 1, wherein a narrowband detection bandwidth of the narrowband detector is variable depending on network conditions.

16. The repeater of claim 1, wherein the controller is configured to adjust the gain or output power of the repeater to meet a network protection or government standard.

17. The repeater of claim 1, wherein the narrowband detector is one or more of:
a spectrum analyzer;
a variable bandwidth narrowband detector;
a digital narrowband detector; or
a narrowband detector that includes a bandpass filter.

18. A signal booster, comprising:
memory; and
one or more processors configured to:
identify one or more power levels that correspond to one or more signals communicated in one or more sub-bands of a selected band;
select a signal from the one or more signals based on a power level of the selected signal; and
perform a network protection by adjusting a gain or output power of the signal booster based on the power level of the selected signal communicated in the one or more sub-bands of the selected band, wherein the gain or output power is adjusted to protect a base station among a plurality of base stations, and the protected base station is not a shortest distance from the signal booster among the plurality of base stations.

19. The signal booster of claim 18, wherein the power level of the selected signal corresponds to a maximum power level of the one or more signals communicated in the selected band.

20. The signal booster of claim 18, wherein the one or more processors are configured to determine a distance between the signal booster and each base station that transmits the one or more signals in the selected band based on the one or more power levels that correspond to the one or more signals.

21. The signal booster of claim 18, wherein the one or more processors are configured to perform the network protection by adjusting the gain or output power of the repeater to protect a base station that is a shortest distance from the signal booster among a plurality of base stations.

22. The signal booster of claim 18, wherein the one or more sub-bands are associated with known cellular carriers.

23. The signal booster of claim 18, wherein each of the one or more sub-bands included in the selected band can range from 100 kilohertz (KHz) or less to 20 megahertz (MHz) or more depending on network conditions.

24. A repeater, comprising:
at least one narrowband detector configured to detect one or more power levels that correspond to one or more signals communicated in one or more sub-bands of a selected band; and
a controller configured to:
select a power level from the one or more power levels, wherein the selected power level corresponds to one of the signals communicated in the one or more sub-bands of the selected band; and
adjust a gain or output power of the repeater based on the selected power level to meet a network protection or government standard, wherein the gain or output power is adjusted to protect a base station among a plurality of base stations, and the protected base station is not a shortest distance from the repeater among the plurality of base stations.

25. The repeater of claim 24, wherein the selected power level corresponds to a maximum power level among the one or more power levels.

26. The repeater of claim 24, wherein the at least one narrowband detector includes a narrowband detector for each selected uplink band and selected downlink band.

27. The repeater of claim 11, wherein the broadband detector and the narrowband detector are configured to operate at a same time.

* * * * *